(12) United States Patent
Kunschir

(10) Patent No.: US 9,352,405 B2
(45) Date of Patent: May 31, 2016

(54) METAL-CUTTING TOOL, IN PARTICULAR REAMING TOOL

(71) Applicant: Kennametal Inc., Latrobe, PA (US)

(72) Inventor: Sebastian Hubert Kunschir, Winklarn (DE)

(73) Assignee: KENNAMETAL INC., Latrobe, PA (US)

( * ) Notice: Subject to any disclaimer, the term of this patent is extended or adjusted under 35 U.S.C. 154(b) by 176 days.

(21) Appl. No.: 14/102,696

(22) Filed: Dec. 11, 2013

(65) Prior Publication Data

US 2014/0169896 A1    Jun. 19, 2014

(30) Foreign Application Priority Data

Dec. 14, 2012   (DE) .......................... 10 2012 223 183

(51) Int. Cl.
   *B23D 77/02*   (2006.01)
   *B23B 29/03*   (2006.01)

(52) U.S. Cl.
   CPC ............... *B23D 77/02* (2013.01); *B23B 29/03* (2013.01); *B23B 2229/04* (2013.01); *B23B 2265/12* (2013.01); *B23D 2277/46* (2013.01); *Y10T 408/5583* (2015.01); *Y10T 408/5586* (2015.01)

(58) Field of Classification Search
   CPC ................... Y10T 408/5586; Y10T 408/5583; B23D 77/02; B23D 2277/46; B23B 2251/56
   See application file for complete search history.

(56) References Cited

U.S. PATENT DOCUMENTS

| | | | | |
|---|---|---|---|---|
| 1,910,940 A | * | 5/1933 | Toske | B23Q 9/00 30/310 |
| 2,074,424 A | * | 3/1937 | Petersen | B23B 41/12 408/147 |
| 2,187,221 A | * | 1/1940 | Brown | B23B 5/167 144/251.1 |
| 2,625,065 A | * | 1/1953 | Trishman | B21H 3/08 29/90.01 |
| 3,286,557 A | * | 11/1966 | Rietzler | B23D 77/04 407/120 |

(Continued)

FOREIGN PATENT DOCUMENTS

| | | | | |
|---|---|---|---|---|
| AT | EP 2745967 A1 | * | 6/2014 | ............. B23B 41/12 |
| DE | 542338 C | * | 1/1932 | ............. B23D 77/14 |

(Continued)

OTHER PUBLICATIONS

Search Report and Written Opinion mailed Jun. 18, 2014.

*Primary Examiner* — Eric A Gates
*Assistant Examiner* — Donte Brown
(74) *Attorney, Agent, or Firm* — Larry R. Meenan

(57) ABSTRACT

The reaming tool comprises a cutting part having a peripherally arranged reaming cutter which, upon rotation about a center axis of the reaming tool, defines a cutting circle of nominal diameter. The reaming tool further comprises at least two peripherally arranged guide elements, which lie on a guide circle arranged eccentrically to the center axis or having a larger diameter than the cutting circle. As a result of this measure, high surface quality is obtained, in particular even in soft materials, since the reaming tool is clamped in the direction of the reaming cutter.

16 Claims, 5 Drawing Sheets

(56) References Cited

U.S. PATENT DOCUMENTS

| | | | | |
|---|---|---|---|---|
| 3,880,545 | A * | 4/1975 | Kress | B23D 77/044 |
| | | | | 408/153 |
| 4,293,252 | A * | 10/1981 | Kress | B23B 29/03407 |
| | | | | 408/207 |
| 4,294,319 | A | 10/1981 | Guergen | |
| 4,425,063 | A * | 1/1984 | Striegl | B23D 77/04 |
| | | | | 407/113 |
| 4,596,498 | A * | 6/1986 | Kress | B23D 77/02 |
| | | | | 408/200 |
| 4,850,757 | A * | 7/1989 | Stashko | B23D 77/048 |
| | | | | 407/45 |
| 5,149,233 | A * | 9/1992 | Kress | B23D 77/02 |
| | | | | 408/199 |
| 5,865,573 | A * | 2/1999 | Kress | B23B 29/02 |
| | | | | 408/147 |
| 5,906,458 | A * | 5/1999 | Planche | B23D 77/048 |
| | | | | 407/37 |
| 5,957,633 | A | 9/1999 | Hall | |
| 6,033,159 | A * | 3/2000 | Kress | B23D 77/02 |
| | | | | 408/199 |
| 6,254,319 | B1 * | 7/2001 | Maier | B23C 5/2444 |
| | | | | 407/45 |
| 6,287,057 | B1 * | 9/2001 | Kurz | B23B 29/02 |
| | | | | 408/1 R |
| 6,536,997 | B1 * | 3/2003 | Kress | B23B 29/02 |
| | | | | 408/1 R |
| 6,554,549 | B1 * | 4/2003 | Kurz | B23B 29/027 |
| | | | | 408/1 R |
| 7,089,837 | B2 * | 8/2006 | Feil | B23B 29/03453 |
| | | | | 408/158 |
| 7,114,893 | B2 | 10/2006 | Mast et al. | |
| 7,363,692 | B2 | 4/2008 | Kress et al. | |
| 7,632,050 | B2 | 12/2009 | Nuzzi et al. | |
| 2003/0077135 | A1 * | 4/2003 | Agarico | B23D 77/025 |
| | | | | 408/232 |
| 2003/0175085 | A1 | 9/2003 | Prokop | |
| 2005/0169721 | A1 | 8/2005 | Schulte | |
| 2008/0152445 | A1 | 6/2008 | Jensen et al. | |
| 2011/0176878 | A1 * | 7/2011 | Nomura | B23B 51/0493 |
| | | | | 408/83 |
| 2013/0004253 | A1 | 1/2013 | Kauper et al. | |
| 2013/0078045 | A1 * | 3/2013 | Randecker | B23B 51/0493 |
| | | | | 408/57 |

FOREIGN PATENT DOCUMENTS

| | | | | |
|---|---|---|---|---|
| DE | 1239911 | B * | 5/1967 | ........... B23D 77/044 |
| DE | 1627222 | A1 * | 8/1970 | ............. B23D 77/02 |
| DE | 1922131 | A1 * | 10/1970 | ............. B23D 77/02 |
| DE | 2237743 | A1 * | 2/1974 | ............. B23D 77/00 |
| DE | 3022984 | A1 * | 1/1982 | ............ B23D 77/048 |
| DE | 3316053 | A1 * | 11/1984 | ............. B23D 77/04 |
| DE | 3402551 | A1 * | 8/1985 | ............. B23D 77/02 |
| DE | 3419350 | A1 * | 11/1985 | ............. B23B 51/048 |
| DE | 3820485 | C1 * | 8/1989 | ............. B23B 51/02 |
| DE | 3842437 | A1 * | 6/1990 | ............ B23D 77/048 |
| FR | DE 102006024569 | A1 * | 12/2007 | .............. B23B 29/03 |
| GC | GB 2075383 | A * | 11/1981 | ........... B23D 77/044 |
| JP | WO 2011142370 | A1 * | 11/2011 | ........ B23B 51/0486 |
| LI | CA 2325061 | A1 * | 5/2001 | ............. B23B 51/00 |

* cited by examiner

METAL-CUTTING TOOL, IN PARTICULAR REAMING TOOL

CROSS-REFERENCE TO RELATED APPLICATION

This application claims priority from German Application Number 102012223183.8 filed Dec. 14, 2012, which is hereby fully incorporated herein by reference.

BACKGROUND OF THE INVENTION

The invention relates to a metal-cutting tool, in particular a rotary tool and preferably a reaming tool, comprising a center axis and comprising a cutting part having a peripherally arranged cutter which, upon rotation about the center axis, defines a cutting circle of nominal diameter, and further comprising two peripherally arranged guide elements.

A metal-cutting tool of this type can be derived for example, in the form of a single-blade reamer, from DD 230810 A1 and from DE 39 39 339 A1.

Reamers of this type are used for the finishing of boreholes. In this context, highly accurate roundness and straightness, as well as a high surface quality of the inner wall of the bore, are of material importance. In the case of a plurality of simultaneously machined boreholes, a precise coaxiality of a plurality of boreholes is additionally of importance. A typical application is the inner surfaces of bearing components, for example in engines.

In order to obtain the best possible drilling results (roundness, straightness etc.), in reaming tools of this type, which often have only a single reaming cutter, guide elements, usually in the form of bars, are attached to the periphery of a tool main body. The radially outermost points of the guide elements lie at a same radial distance to the center axis and, upon an imaginary rotation about the center axis, define a guide circle. Correspondingly, the cutter, upon rotation about the center axis, defines a cutting circle. The diameter of the guide circle is here consistently smaller than the diameter of the cutting circle.

In the machining operation, the tool is deflected due to the generated metal-cutting forces until the guide elements come to bear against the inner wall of the bore. Due to this deflection, in the machining operation the center axis of the tool itself, in turn, runs on a circle, which circle should run concentrically to the desired borehole axis.

In order to ensure the necessary contact of the guide elements against the inner wall of the bore, the deflection force which is generated in the cutting operation must be sufficiently large to overcome the elastic restoring force of the tool. Particularly in tools having larger diameters and having a consequently high natural rigidity, in the machining of soft lightweight materials, such as, for example, aluminum or magnesium alloys, the problem arises, however, that insufficient deflection force is generated in the cutting operation. This can sometimes lead to a poor and undefined guidance of the tool, so that the desired dimensional precision, in particular a desired roundness, cannot be maintained within predefined tolerances.

A further problem exists in the machining of through holes. At the end of the borehole, the deflection force dramatically declines, whereby the entire tool leaps back into the center of the borehole. As a result, damage can occur to the produced borehole surface. This problem also exists in the withdrawal from the produced borehole, since the tool springs back and penetrates the already machined surface and damages the same.

SUMMARY OF THE INVENTION

Based on the above, the object of the invention is to define a metal-cutting tool, in particular a reaming tool, with which high dimensional precision is ensured, in particular even in the case of low deflection forces.

The object is achieved according to the invention by a metal-cutting tool, in particular a rotary tool, and preferably a reaming tool, having the features of claim 1.

The metal-cutting tool extends along a center axis and comprises a cutting part having a peripherally arranged cutter, which is also referred to as a reaming or finishing cutter, and which, upon an imaginary or actual rotation about the center axis, defines a cutting circle of nominal diameter. The metal-cutting tool additionally comprises in the region of the cutting part at least one, usually two or more peripherally arranged guide elements, which are configured, in particular in the style of guide bars and which usually extend in the direction of the center axis. The guide bars are preferably soldered or glued in place and typically consist of hard metal, cermet or PCD (polycrystalline diamond). The basic material of the cutting part, in particular the material of a carrier, usually consists of a material of, in comparison to the material of the guide bars, lesser hardness, for example tool steel. The cutters likewise consist of standard hard cutting materials. In order to ensure high roundness precision, the guide elements, viewed in a cross section perpendicular to the center axis, lie on a guide circle arranged eccentrically to the center axis and/or having a larger diameter than the cutting circle.

These two design variants, which can be realized selectively or else in combination, are based on the fundamental idea of applying a type of pretension or contact pressure from the outset in the direction of the cutter, so that, in the cutting or reaming operation, a deflection toward the guide elements is unnecessary or is necessary only in small measure.

The cutter comprises a cutting edge, which is usually arranged axially in advance of the guide elements. This so-called cutter advancement lies typically within the range of 0.3-0.4 mm. At the start of the machining of the workpiece, i.e. in particular of the borehole machining, the cutter initially, therefore, merely engages with the cutting edge in the bore wall. Upon further feeding in the axial direction, the guide elements then, as a result of the adopted measures, come into contact with the bore wall out of necessity and deflect the tool in the direction of the cutter. It is thereby reliably ensured, even in the case of soft materials, that the guide bars also actually bear against the inner wall of the bore.

By rotary tool, a tool which, when it is used, rotates about its center axis is generally understood here. For this purpose, the rotary tool has a chucking shank, with which it is clamped into a corresponding metal-working machine. The concept which is described here can also be transferred, however, to fixed metal-cutting tools which do not rotate in the metal-cutting operation. In this case, the workpiece rotates and the metal-cutting tool engages in the workpiece.

Due to the specific geometry which is chosen here, adapters which are known per se, and via which a radial offset between a drive spindle of the metal-working machine and the center axis of the metal-cutting tool can be adjusted, are preferably neither necessary nor provided, or the adapter is adjusted to the basic setting, so that the spindle centerline and the center axis coincide.

The first guide element, which trails the cutter in the rotational direction, is usually spaced apart from the cutter only by a small angular distance of, for example, 10-20°. By contrast, the second guide element is arranged roughly opposite the cutter. In principle, more than two guide elements can also be provided. The guide elements themselves are, for example, rounded or spherical, or else beveled.

In order to achieve the desired highly accurate shaping, in particular the roundness, concentricity references are usually configured on the rotary tools. These constitute defined testing or measuring positions, at which, for example by measuring instruments, the concentricity of the metal-cutting tool is checked and by means of which, for example, a possible fine adjustment of the (radial) position of the tool within a machine tool is also performed. This can be realized, for example, with a correspondingly configured adapter. Via these concentricity references, the center axis is preferably defined, i.e. the center axis runs through the respective center of the respective concentricity reference. As a rule, this also corresponds to the spindle centerline of the machine tool and to the rotational axis about which the tool in the unloaded case, i.e. when not engaged in the workpiece, rotates.

The concept which is described here, comprising the eccentric arrangement of the guide elements, is therefore generally characterized in that the guide elements are arranged eccentrically to the center axis of the concentricity references.

As a rule, this means that—in the unloaded state—the center of the cutting circle coincides with the center axis and the center of the guide circle is distanced herefrom by the eccentricity.

The fundamental concept of the application of a pretension can also be achieved, however, by a purposeful "eccentric arrangement" of the tool in the metal-cutting machine. In order to here be able to resort to the usual adjustment methods familiar to the machine operators (with respect to the concentricity via the concentricity references), in an advantageous alternative or supplement it is provided that the concentricity references themselves are deliberately configured "eccentrically", for example by a weld-on operation, that the center axis defined by these is displaced with respect to an actual central axis of the tool by the extent of the eccentricity. At least in a shank part adjoining the cutting part, the tool has a rotationally symmetrical design, in particular mass distribution, so that no imbalance arises. The center of the mass distribution defines the central axis and, if the concentricity references are conventionally configured, the center axis.

In the variant comprising the eccentric arrangement of the guide circle, the diameter of the cutting circle is preferably around 5 to 15 μm and, in particular, around 10 μm larger than that of the guide circle. In traditional tools, as are previously known from the prior art, the diameter of the guide circle is usually chosen about 20 μm smaller than the diameter of the cutting circle.

In the embodiment comprising the eccentric arrangement of the guide circle, this is preferably around 10 μm smaller than a bore target diameter which is intended to be achieved. Since, as a consequence of the eccentric arrangement, the deflection is already anticipated, unlike traditional drilling tools the nominal diameter is at most as large as or slightly larger than the bore target diameter.

The eccentric offset of the center of the guide circle in relation to the center of the cutting circle is therefore generally preferably chosen such that the difference in diameter between the cutting circle and the guide circle is at least compensated or overcompensated. By this it is understood that the eccentricity is chosen such that, in the case of given geometry of the cutting part with given angular distribution of the cutter and of the guide elements, the otherwise necessary deflection is already anticipated, i.e. compensated. In traditional reaming tools, the center of rotation of the tool, i.e. the center axis and thus the center of the cutting circle, is deflected out of the desired borehole center by the deflection.

In the compensation, the eccentric design of the guide circle is preferably precisely chosen such that this deflection is anticipated, so that, in the reaming operation, the center axis of the reaming tool coincides with the desired borehole axis. In this case, the nominal diameter therefore corresponds to the bore target diameter, or lies within the tolerances somewhat above this. In an overcompensation, the center axis is "pretensioned" in the opposite direction beyond the desired borehole axis, so that in this case the nominal diameter is chosen even smaller than the bore target diameter. The center of the cutting circle lies on the center axis. The center of the guide circle is therefore arranged eccentrically to the center axis.

From the angular distribution of the cutter(s) and of the guide elements which in the metal-cutting operation bear against the workpiece (generally precisely two guide elements, even if several are provided), and under the assumption that the deflection of the cutter is anticipated, and thus compensated, by the eccentricity, if the difference in diameter between the cutting circle and the guide circle is predefined, the value of the eccentricity E is approximately preferably determined according to the following formula: $E=0.5*(D1-D2)*\cos(0.5*\delta)$ wherein E is the eccentricity, D1 the diameter of the cutting circle, D2 the diameter of the guide circle and $\delta$ the angle between the guide elements. By approximately, a deviation of +/−10% in the determined values is preferably understood here. By this formula, a value for the eccentricity is therefore stated, which value compensates the otherwise occurring deflection of the cutter. The eccentricity is preferably set at a value between 0.5 times and double the value determined according to this formula.

Expediently, the eccentricity, i.e. the offset between the center of the cutting circle and the center of the guide circle, is greater than 3 μm and is typically around 7 μm. Given such an offset, a compensation is usually achieved. Alternatively, the eccentricity can also be chosen significantly greater than 7 μm and can measure, for example, up to 30 μm, i.e. can lie within the range, for example, between 10 and 30 μm, so that an overcompensation occurs and a type of radial pretensioning force is applied in the direction of the cutter.

Generally, in this case, the eccentricity is thus preferably greater than a difference in radius between the radius of the guide circle and the radius of the cutting circle.

In an expedient refinement, the center of the guide circle here is displaced in a deflection direction determined by a resultant force direction of a deflection force to which the cutting part is subjected upon engagement in a workpiece and given a predefined cutter position and position of the guide elements. This embodiment too is based on the basic consideration of anticipating and compensating the previously necessary deflection. In particular the choice of deflection direction, in combination with the measure of the distance and thus of the eccentricity to the center of the cutting circle, ensures the desired compensation and thus the desired high roundness.

The orientation of the deflection direction is influenced by the choice of position of the guide elements in relation to the cutter, the choice of number of the cutters, and the angular positioning of the same. In general, the center of the guide circle is displaced within a circular segment between two guide elements at which, in metal-cutting operation, the tool is supported against the workpiece (borehole inner wall).

According to an expedient embodiment, only one cutter and exactly two guide elements are provided. In this case, the center of the guide circle is displaced roughly in the direction of, at least roughly in the direction of the angle bisector between the two guide bars. By "roughly", a deviation of up to +/−20° from the exact angle bisector is understood here.

In an embodiment comprising a plurality of cutters, the center of the guide circle is usually displaced within the part-circle between the two cutters, i.e., viewed in the rotational direction, between the leading and the trailing cutter.

Preferably, the guide elements are arranged on an imaginary cylinder surface and the cylinder axis runs through the center of the guide circle. The cylinder axis here runs preferably axially parallel to the center axis. Alternatively, for this purpose, it can also be oriented slightly tilted. It is crucial that in the front region of the cutting bars the desired eccentricity is present In the construction variant in which the guide circle has a larger diameter than the cutting circle, the guide elements are distributed over an angular distance less than 180°. As a result of this measure, the deflection of the drilling body into the semicircle half lying opposite the guide elements is enabled, so that the guide circle can be chosen larger than the cutting circle given a simultaneously concentric arrangement. In the concentric arrangement, the two centers of the cutting circle and of the guide circle therefore lie on the center axis. In principle, another eccentric arrangement of the center of the guide circle can also additionally be chosen.

For the desired compensation, the diameter of the guide circle here is expediently at least 3 μm larger than the diameter of the cutting circle. Preferably, the diameter is in the range of between 3 μm and 15 μm larger.

In an expedient refinement, in addition to the cutter configured as a reaming or finishing cutter, there is arranged a further roughing cutter, which is disposed in advance of the finishing cutter in the axial direction. The cutting circle is here defined by the finishing cutter. The roughing cutter is radially set back from the finishing cutter. As a result of this design, a high metal-cutting capacity combined with simultaneously high surface quality can be obtained.

By the guide elements, an (imaginary) guide cylinder is defined. This has a very high-precision design and has a cylindricity of 1 μm over 100 mm length and has a diameter tolerance and a roundness tolerance of only 3 μm. By cylindricity, the deviation from a circular cylinder in the longitudinal direction of the tool is understood here. By diameter tolerance it is understood that the diameter may vary to a maximum degree within the scope of this tolerance by the breadth of the cutting part. Finally, by roundness tolerance it is understood that, upon rotation about the center axis, the radial variation at a fixed measuring point may amount to a maximum of 3 μm.

BRIEF DESCRIPTION OF THE DRAWINGS

Illustrative embodiments of the invention are explained in greater detail below with reference to the figures, wherein, respectively in schematic representations.

In the figures, identically acting parts are provided with the same reference symbols.

DETAILED DESCRIPTION

Figure 1:
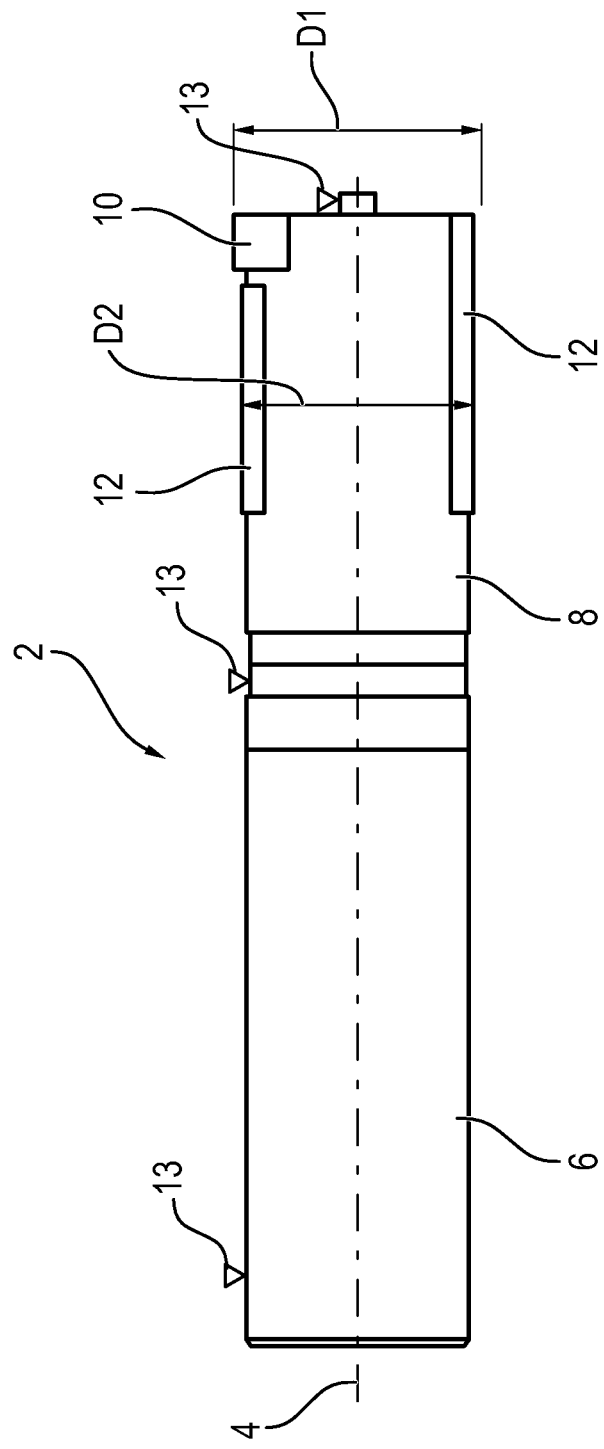
FIG. 1 shows a schematic lateral representation of a single-cutter reaming tool.
Figure 4:
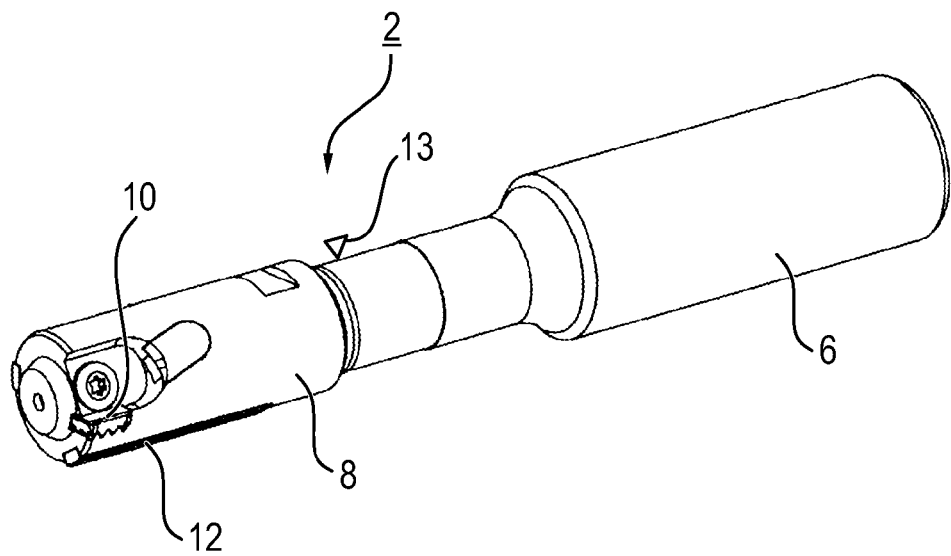
FIG. 4 shows a perspective representation of a single-cutter reamer comprising two guide elements, configured in the style of guide bars.

A single-cutter reaming tool 2, as is represented schematically in FIG. 1 and is represented in greater detail in FIG. 4, extends regularly along a center axis 4 from a rear chucking shank 6 to a front cutting part 8. The cutting part 8 has a tool main body made, for example, of a tool steel. In the represented single-cutter reaming tool 2, to this main body is attached precisely one reaming or finishing cutter 10. This can be soldered, for example, into the tool main body or—as can be seen from FIG. 4—exchangeably fastened with the aid of a clamping device.

In addition, to the cutting part 8 are attached at least two guide elements 12, in particular in the form of longitudinally extending guide bars. These are usually soldered in place. The guide elements 12 and the cutter 10 usually consist of a wear-resistant material, in particular, for example, of hard metal.

In such a reaming tool 2, a plurality of positions are usually provided and configured as concentricity references 13. These constitute defined measuring positions, via which the concentricity of the tool 2 when rotated about the center axis 4 is checked or is adjusted on a machine tool in which the reaming tool 2 is clamped. In the illustrative embodiment, for this purpose, a cylindrical pin of (compared to the cutting part) significantly reduced diameter is disposed on the end face at the front end of the cutting part 8 and, after this, an annular groove is made on the cutting part. In addition, in the illustrative embodiment, a further concentricity reference 13 is optionally configured on the rear or front end of the chucking shank. By these concentricity references 13, which are thus respectively formed by highly accurate cylindrical sections, the center axis 4, which runs through the center of these cylindrical sections is defined.

A schematic frontal view of the reaming tool 2 represented in FIGS. 1 and 4 is represented in FIG. 2. During use, i.e. in the reaming operation, the reaming tool rotates about the center axis 4 in the rotational direction 14. To the cutter 10 are assigned, at an angular spacing, say, of 10° to 20°, the first guide element 12A and, roughly opposite, i.e. trailing by 180°, the second guide element 12B. When rotated about the center axis 4, the cutter 10 produces a cutting circle 16 of nominal diameter D1. At the same time, the guide elements 12A, 12B define a guide circle 18 of guide diameter D2. The guide elements 12A, 12B are therefore equally far distanced with respect to a center 28A of the guide circle 18.

Figure 2A:
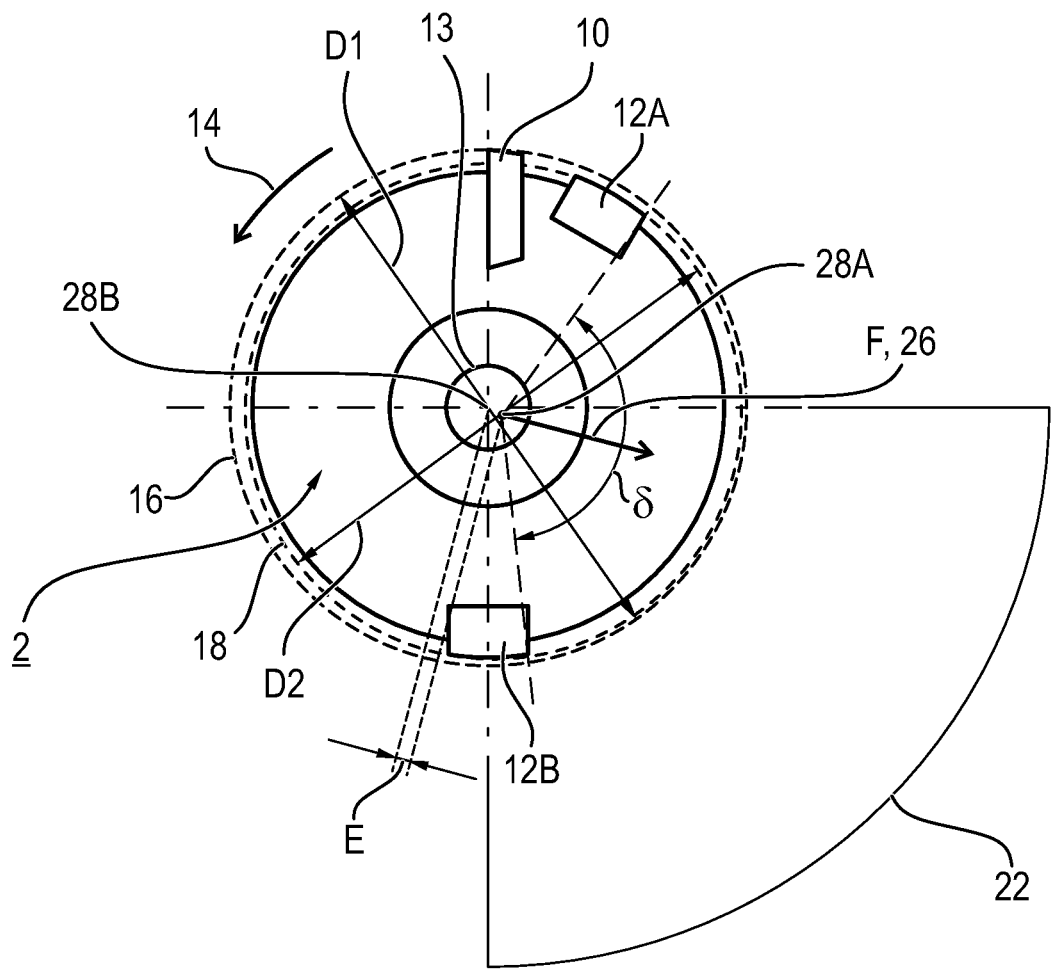
FIG. 2A shows a schematic frontal view of a single-cutter reaming tool of this type comprising two guide elements.

The two guide elements 12A, 12B are spaced apart from one another by an angular distance □, which in the illustrative embodiment of FIG. 2A lies roughly in the region of 140°. The angular distance □ is defined here as the angular distance between the angular positions at which the guide elements 12A, 12B, during use, come to bear against a bore wall of a bore. Usually, these are in each case the mutually facing (rounded) corner regions (side edges).

Figure 2B:
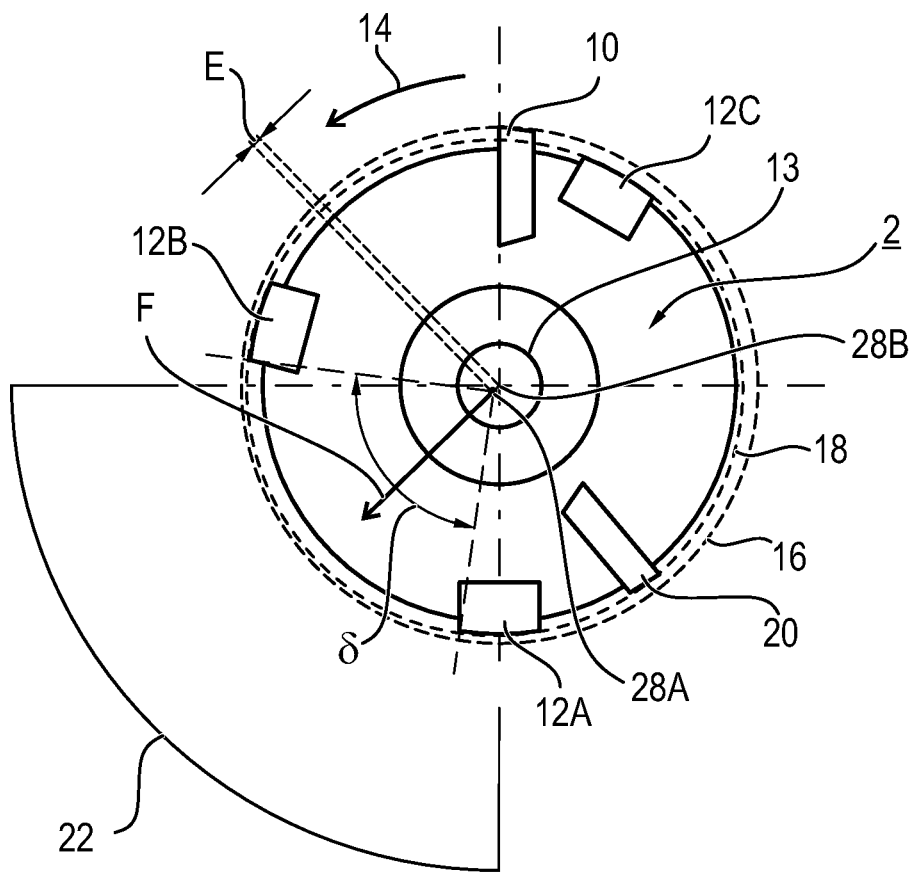
FIG. 2B shows a schematic frontal view of a reaming tool comprising two cutters for roughing and finishing machining and comprising three guide elements in total.

FIG. 2B shows an alternative embodiment of a reaming tool 2 comprising a cutter for premachining, which cutter is also referred to as a roughing cutter 20 and is arranged additionally to the actual reaming cutter 10. The roughing cutter 20 is arranged in advance of the reaming cutter 10 and has a smaller radial distance to the center axis 4 than the reaming cutter 10. The cutting circle 16 is defined by the reaming cutter 10. In this construction variant, three guide elements 12A, 12B, 12C in total are arranged. The first guide element 12A is in turn arranged at a small angular distance of, for example, a maximum of 30° behind the leading roughing cutter 20. The second guide element 12B is arranged trailing the first guide element 12A and in front of the reaming cutter 10 roughly midway between these two elements. The third guide element 12C is in turn arranged trailing the reaming cutter 10 at a small angular distance of a maximum of 30°.

In FIG. 2A, 2B is further respectively illustrated a quadrant 22, i.e. a part-circle segment. In the reaming operation, i.e. upon engagement of the reaming tool 2 with the workpiece 24 (cf. FIG. 3A to 3C), a deflection force F acts on the reaming tool 2 in the deflection direction 26 indicated by the arrow. The deflection direction 26 lies within the quadrant 22. It is usually oriented at least roughly in the direction of the angle bisector of the angular distance □. Even in the case of more than two guide bars 12, the tool is usually supported during use against two defined guide bars 12A, 12B.

As is represented in FIG. 2A, in the inventive reaming tool the center 28A of the guide circle 18 is displaced in the deflection direction 26 by an eccentricity E with respect to the center axis 4, and thus also with respect to the center 28B of the cutting circle 16.

Figure 3A:
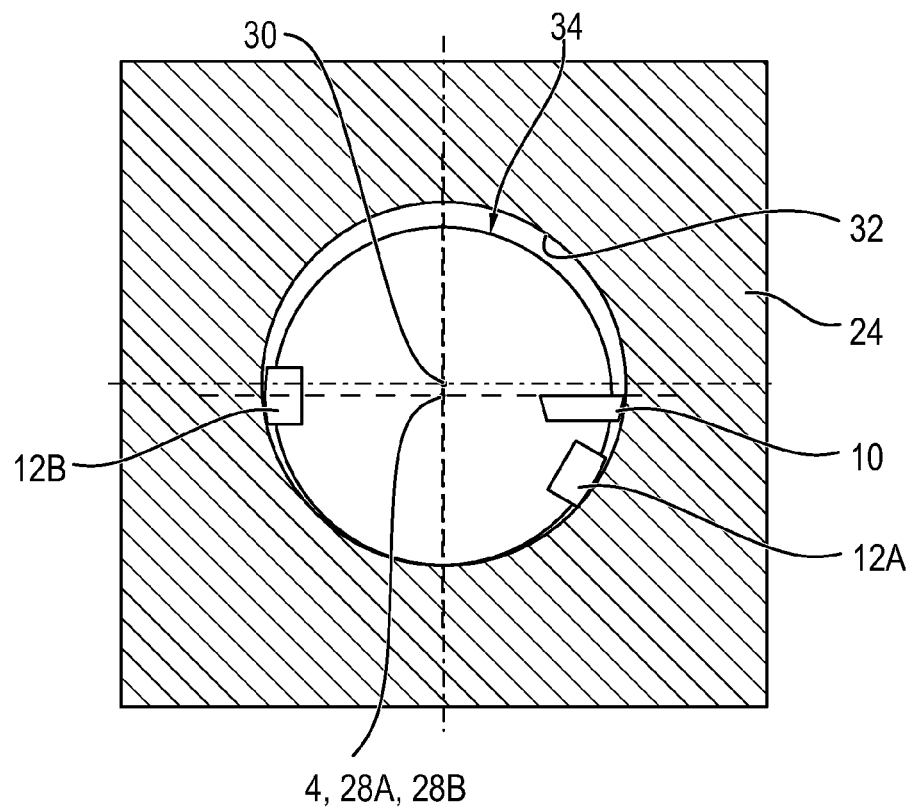
FIG. 3A shows the use of a single-cutter reaming tool according to the prior art during the reaming operation in a workpiece.
Figure 3B:
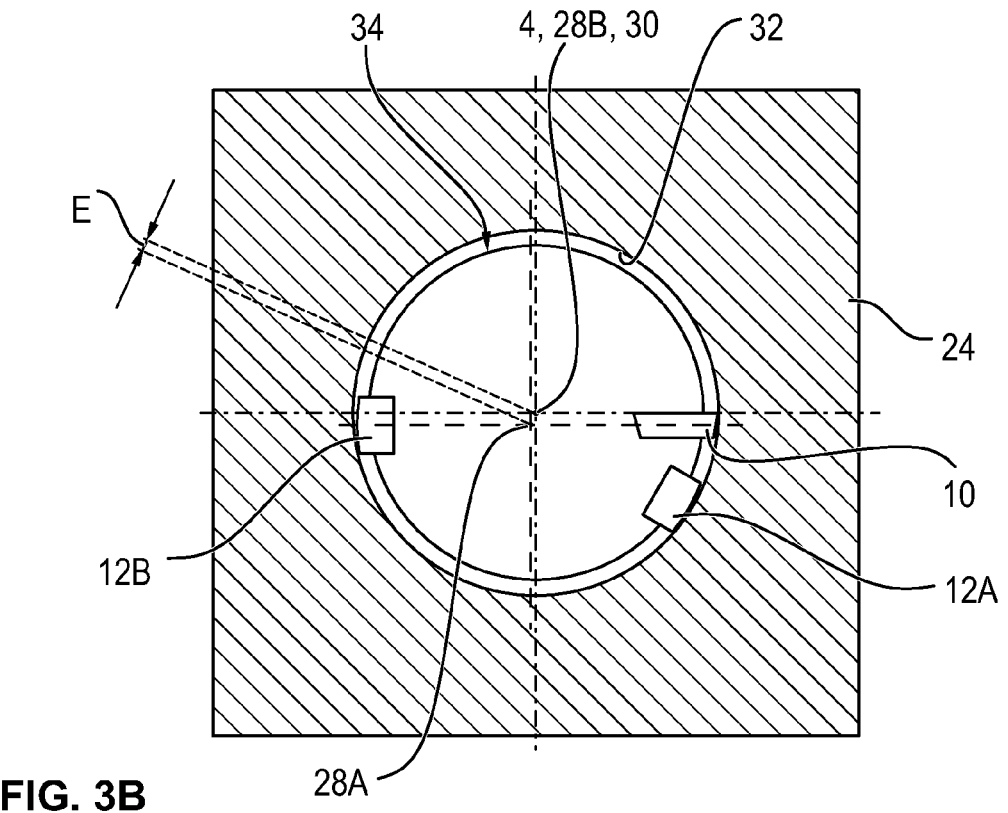
FIG. 3B shows a representation, comparable to FIG. 3A, of an inventive single-cutter reaming tool during the reaming operation in a workpiece, given an eccentric arrangement of the guide circle.
Figure 3C:
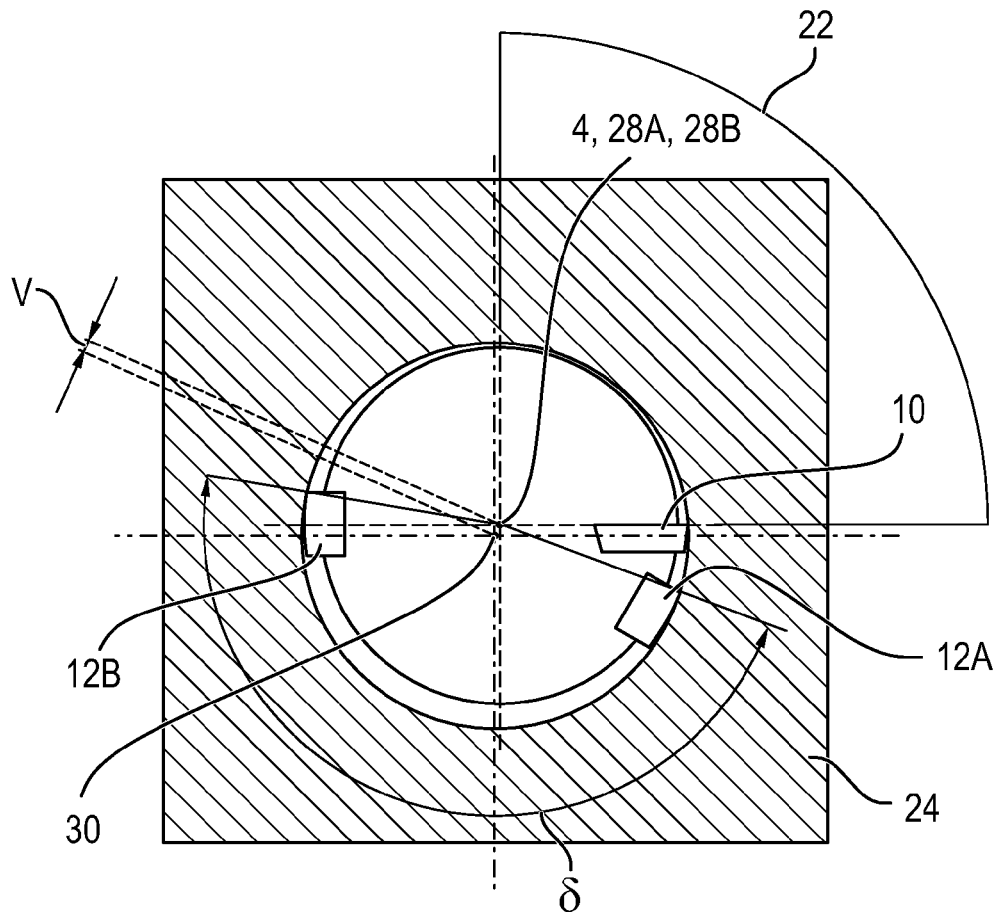
FIG. 3C shows a representation, comparable to FIG. 3A, B, of a second inventive embodiment of a single-cutter reaming tool, in which the guide circle has a larger diameter than the cutting circle.

With reference to FIG. 3A to 3C, the situation during the actual reaming operation, and the inventive concept, are now described. FIG. 3A here shows a situation according to the prior art, in which, as a consequence of the engagement of the reaming cutter 10 with the workpiece 24, the reaming tool 2 is deflected in the deflection direction 26 (cf. FIG. 2A), so that the center axis 4 is displaced and is arranged eccentrically to a desired borehole axis 30. The center axis 4 and the centers 28A, B of the guide circle 18 and of the cutting circle 16 coincide in the prior art. As can be seen, as a consequence of the deflection, the guide elements 12A, 12B bear against a bore wall 32 of a bore 34. As can be seen from the distance of the perimeter of the reaming tool 2 to the bore wall 32, a still significant deflection in one direction is necessary.

The comparable situation in the use of an inventive reaming tool 2 with eccentric arrangement of the guide circle 18 is represented in FIG. 3B. The displacement of the center 28A of the guide circle 18 is in this case chosen, in particular, such that it corresponds precisely to the displacement, represented in FIG. 3A, of the center axis 4 as a consequence of the deflection force F and thus exactly compensates this deflection. The other geometric data, such as cutter position and position of the guide elements 12 etc., are identical here. In this case, therefore, only the center 28A is arranged offset by the eccentricity E with respect to the center axis 4, which in this specific case of exact compensation coincides with the borehole axis 30. The center of the cutting circle 28B, in turn, lies on the center axis 4. As can be seen, by virtue of the chosen eccentric arrangement of the center 28A, the reaming tool 2 is "pretensioned" counter to the deflection force F, so that a deflection is unnecessary. All in all, an improved guidance is thereby obtained, including in the machining of soft materials, particularly given reaming tools 2 which are at the same time rigid.

Finally, in FIG. 3C, an alternative variant to the eccentric arrangement of the guide circle 18 is represented. In this variant, the two guide elements 12A, 12B are arranged at an angular distance δ apart which is smaller than 180° and which lies, for example, within the range from 140° to 170°. In this construction variant, it is now provided that the nominal diameter D1 is smaller than the guide diameter D2. As a result of this measure, a deflection of the reaming tool 2 into the semicircle half lying opposite the guide elements 12A, 12B occurs. The center axis 4, and thus also at the same time the center 28A and the center 28B, all of which coincide, are therefore arranged offset by an offset V in relation to the borehole axis 30. The entire reaming tool 2 is now deflected exactly counter to the deflection direction 26 (cf. FIG. 2A) into the opposing semicircle half, so that, in this way, the compensation of the deflection which otherwise arises in the cutting operation is realized. In FIG. 3C, the quadrant 22 into which the deflection is made is illustrated.

The invention is not just confined to the single-cutter reaming tool represented in FIGS. 1 and 4. Alternatively hereto, the inventive concept can be used also in stepped reamers for the machining of stepped boreholes, conical reamers for the machining of conical boreholes, or else external reamers, in which not the inner wall of a bore, but rather the outer wall of a bolt or shank is finished. An external reamer of this type has a cutting part having a centrically arranged cylindrical cavity for the enclosure of the shank to be machined. The cutter is in this case configured on the periphery of the cavity with radially inward-facing cutting edge.

What is claimed is:

1. A metal-cutting tool having a center axis, comprising:
a cutting part having at least one peripherally arranged cutter which, upon an imaginary rotation about the center axis, defines a cutting circle of nominal diameter; and
at least one peripherally arranged guide element which viewed in a cross section lies on a guide circle, the center of which is either arranged eccentrically to the center axis by an eccentricity or which has a larger diameter than the cutting circle, wherein the at least one peripherally arranged guide element includes two guide elements that are arranged, with which the metal-cutting tool in the metal-cutting operation is supported against a workpiece, and which are spaced apart at an angular distance (δ), the amount of eccentricity (E) being determined according to the formula: E=0.5*(D1−D2)*cos (0.5*δ), wherein E is the eccentricity, D1 the diameter of the cutting circle, D2 the diameter of the guide circle and δ the angle between the guide elements.

2. The metal-cutting tool of claim 1, having concentricity references, via which the center axis is defined.

3. The metal-cutting tool of claim 1, wherein in an eccentric arrangement of the guide circle, the diameter of the cutting circle is in the range of between 5 and 15 µm larger than that of the guide circle.

4. The metal-cutting tool of claim 1, wherein the eccentricity is greater than or equal to 3 µm.

5. The metal-cutting tool of claim 1, wherein the eccentricity is greater than a difference in radius between the radius of the guide circle and the radius of the cutting circle.

6. The metal-cutting tool of claim 1, wherein the center of the guide circle is displaced in the deflection direction determined by a resultant force direction of a deflection force to which the cutting part is subjected upon engagement in a workpiece during the metal-cutting operation and given a predefined position of the at least one cutter.

7. The metal-cutting tool of claim 1, wherein the at least one peripherally arranged guide element consists of two guide elements that are arranged and the center of the guide circle is displaced roughly in the direction of an angle bisector between the two guide elements.

8. The metal-cutting tool of claim 1, wherein the at least one peripherally arranged guide element includes two guide elements that are arranged, with which the metal-cutting tool in the metal-cutting operation is supported against a workpiece and which are distributed over an angular distance ($\delta$) less than 180°.

9. The metal-cutting tool of claim 1, wherein only one cutter is provided.

10. A reaming tool having a center axis, comprising:
a cutting part having at least one peripherally arranged cutter which, upon an imaginary rotation about the center axis, defines a cutting circle of nominal diameter; and
at least one peripherally arranged guide element which viewed in a cross section lies on a guide circle, the center of which is either arranged eccentrically to the center axis by an eccentricity or which has a larger diameter than the cutting circle, wherein the at least one peripherally arranged guide element includes two guide elements that are arranged, with which the reaming tool in the metal-cutting operation is supported against a workpiece, and which are spaced apart at an angular distance ($\delta$), the amount of eccentricity (E) being determined according to the formula: $E=0.5*(D1-D2)*\cos(0.5*\delta)$, wherein E is the eccentricity, D1 the diameter of the cutting circle, D2 the diameter of the guide circle and $\delta$ the angle between the guide elements.

11. The reaming tool of claim 10, wherein in an eccentric arrangement of the guide circle, the diameter of the cutting circle is in the range of between 5 and 15 μm larger than that of the guide circle.

12. The reaming tool of claim 10, wherein the eccentricity is greater than or equal to 3 μm.

13. The reaming tool of claim 10, wherein the eccentricity is greater than a difference in radius between the radius of the guide circle and the radius of the cutting circle.

14. The reaming tool of claim 10, wherein the center of the guide circle is displaced in the deflection direction determined by a resultant force direction of a deflection force to which the cutting part is subjected upon engagement in a workpiece during the metal-cutting operation and given a predefined position of the at least one cutter.

15. The reaming tool of claim 10, wherein the at least one peripherally arranged guide element consists of two guide elements that are arranged and the center of the guide circle is displaced roughly in the direction of an angle bisector between the two guide elements.

16. The reaming tool of claim 10, wherein the at least one peripherally arranged guide element includes two guide elements that are arranged, with which the metal-cutting tool in the metal-cutting operation is supported against a workpiece and which are distributed over an angular distance ($\delta$) less than 180°.

* * * * *